UNITED STATES PATENT OFFICE.

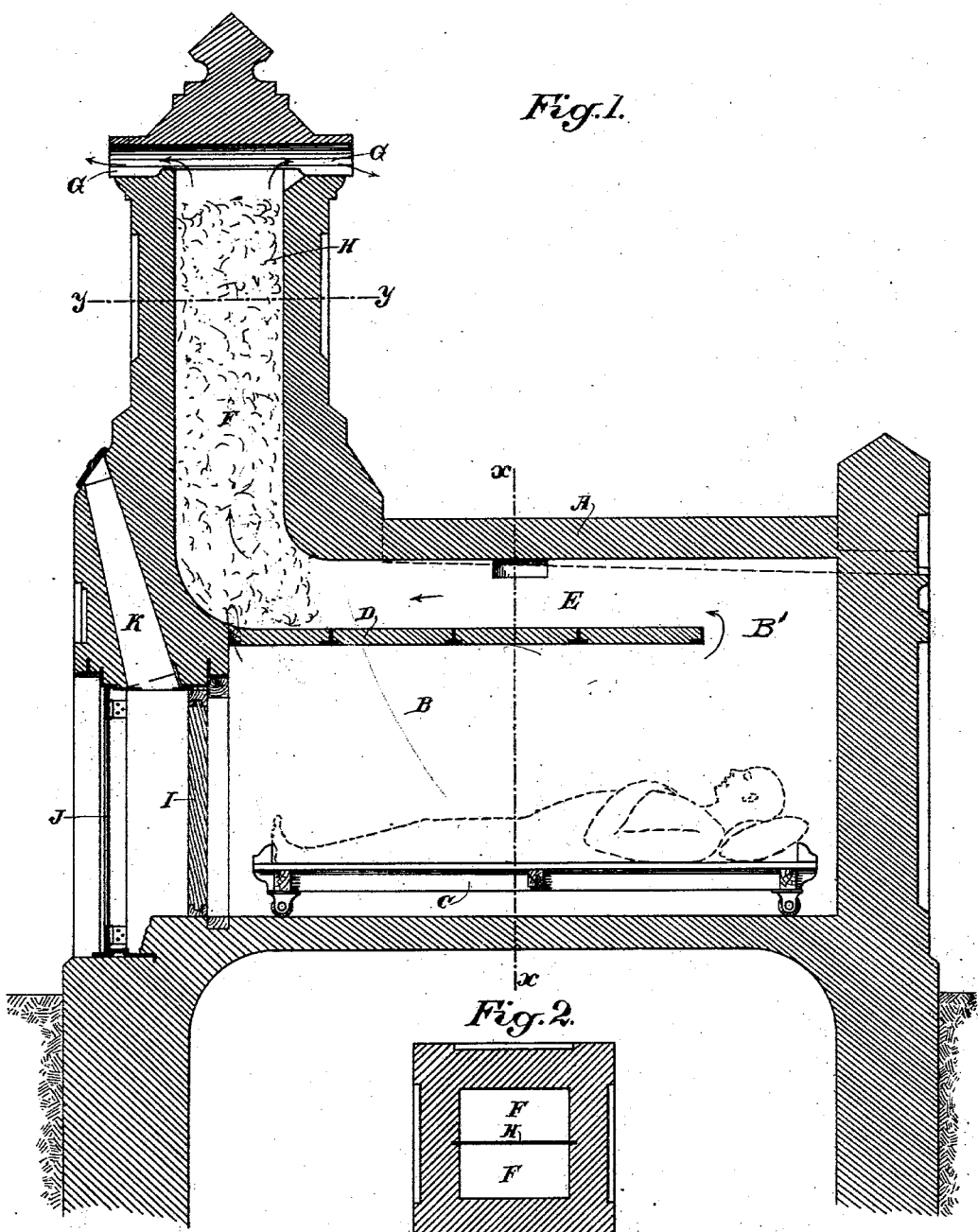

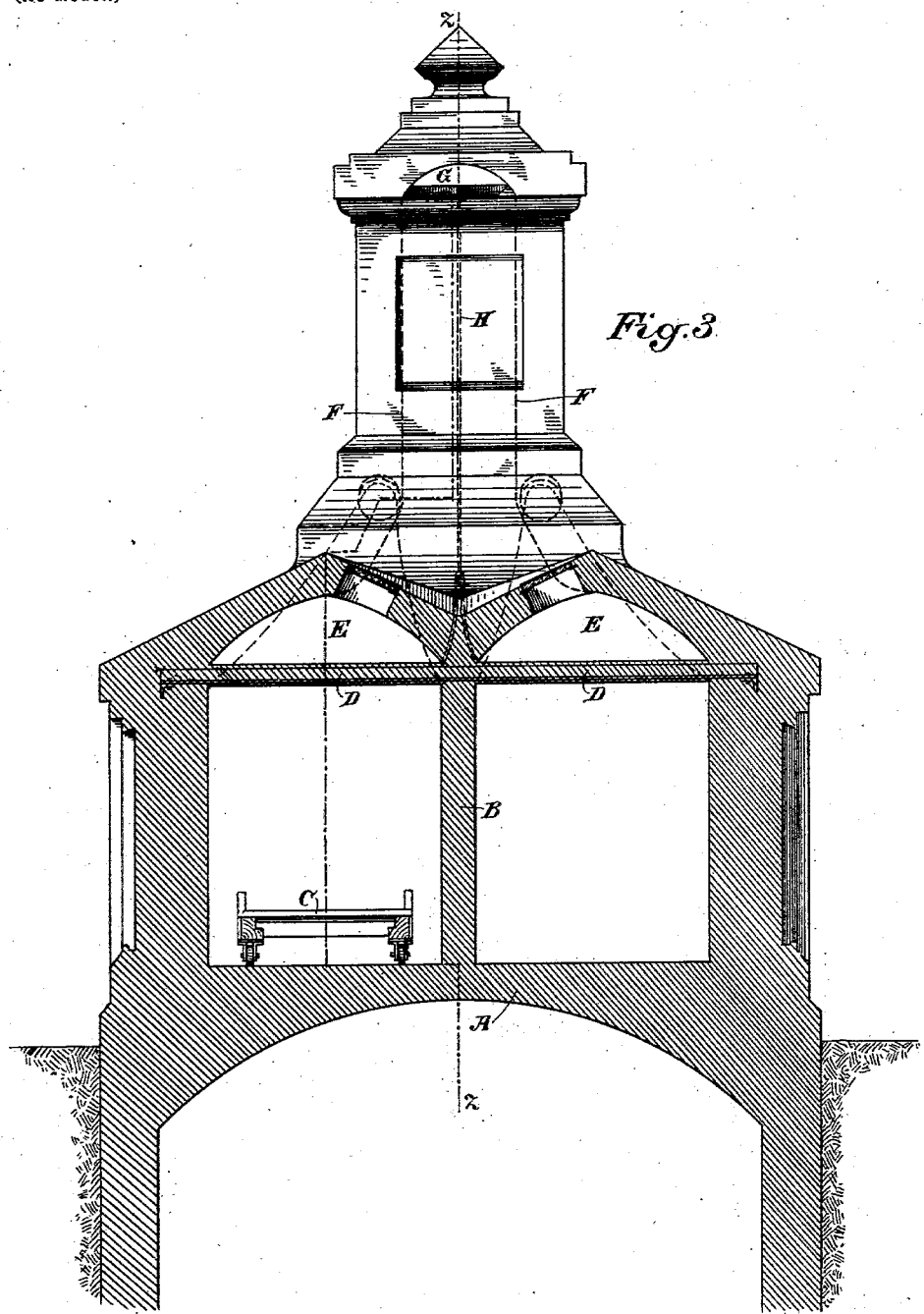

HENRY ROOT, OF SAN FRANCISCO, CALIFORNIA.

BURIAL-VAULT.

SPECIFICATION forming part of Letters Patent No. 634,123, dated October 3, 1899.

Application filed May 1, 1899. Serial No. 715,133. (No model.)

*To all whom it may concern:*

Be it known that I, HENRY ROOT, a citizen of the United States, residing in the city and county of San Francisco, State of California, have invented an Improvement in Burial-Vaults; and I hereby declare the following to be a full, clear, and exact description of the same.

My invention relates to an improvement in vaults for burial purposes.

It consists in the parts and in the constructions, arrangements, and combinations of parts, which I will hereinafter describe and claim.

Figure 1 is a vertical section taken through a single chamber of such an apparatus on line $z\,z$, Fig. 3. Fig. 2 is a transverse section taken through $y\,y$ of Fig. 1. Fig. 3 is a transverse section on the line $x\,x$ of Fig. 1, showing a double-chambered apparatus.

The object of this invention is to furnish a means for the disposition of the bodies of the dead without danger of annoyance to the living and without shock to the feelings of friends caused by the usual method of inclosing the body in a close box or casket and burying it in the ground.

The essential features of my invention are a fixed structure formed of masonry substantially complete at the time of burial, which requires at that time nothing more than the deposit of the body in a dry light chamber and closing of the doors, no close coffin being necessary for the purpose. Under these conditions the body is surrounded by dry air and undergoes the natural process of decomposition, and the gases thus generated are absorbed and neutralized in substances intended by nature for this purpose.

The structure is of itself a monument to the memory of the dead, appropriate and pleasing in appearance, and suitable for elaborate inscription to perpetuate a record of the person.

These structures may be constructed for one or more bodies; but in case that more than one chamber is formed in the same structure the appurtenances and connections should be entirely separate by reason of the time which may elapse between the deposit of the bodies.

A is a structure which may be made of stone, concrete, or any suitable or desired material, and it may be formed with a single receiving-chamber, or a plurality of chambers may be made in the same structure, in which case each chamber would be separated from the contiguous chamber or chambers by a vertical wall or partition B. The chambers are made of any desired size adapted to receive the body, which, suitably draped, may be placed upon a carriage C, mounted upon wheels or otherwise adapted to be easily moved into the chamber. In the upper part of each chamber is a horizontal diaphragm or partition D, which extends, as here shown, from the front to a point near the rear of the chamber. Above this partition is a second chamber or passage E, and the open communication or passage B' between the upper and lower chamber at the end allows gases of decomposition to rise naturally into the upper chamber, and they are conveyed through this upper chamber to the vertical flue F. This flue may be made of any height, and the exterior body forms a tower for the structure of any desired architectural and pleasing form. Connecting with the upper end of the flue F is a transverse passage or passages G, opening directly to the air. If two or more of the chambers are employed, as shown in Fig. 3, then the vertical flue F will be divided by a suitable partition H, and the chambers or passages E connect one with each side of this diaphragm. The space within this vertical flue is filled with fresh charcoal, which is known to be one of the best purifiers and deodorizers, and, if desired, the upper chamber or other part of the structure may contain any suitable or desired chemical which will assist in the absorption or neutralizing of the gases arising.

When the body has been placed within the lower chamber, doors I and J are closed and secured.

Between the inner and outer doors is a space of sufficient size, and extending upwardly from this space is a passage K, through which any desired material may be introduced to fill the space. In some cases if the chamber is to be permanently sealed this space may be filled with cement, concrete, or any similar suitable material, or it may, if desired, be filled with charcoal or any disinfecting or deodorizing material if it is intended to open the chamber at some future time. In this case the charcoal will be easily removed by simply opening the outer door, thus exposing the inner door, which can be afterward opened.

If it is desired to place ornamental or inscription slabs or panels upon the structure, they may be fitted into the sides or ends either in depressions made for the purpose or otherwise and suitably secured by anchors or cement.

I do not wish to confine myself to any special form or outline of the structure, since it will be manifest that it may be varied architecturally and otherwise to suit conditions or the tastes of those in charge of the construction.

Having thus described my invention, what I claim as new, and desire to secure by Letters Patent, is—

1. A tomb, burial-vault or like fixed structure consisting of a chamber having masonry walls and an end entrance, said chamber having a partition or diaphragm terminating short of one end of the chamber and forming a passage therein which connects with the open air, said passage adapted to receive a disinfecting and deodorizing material.

2. A tomb or burial-vault consisting of a chamber with masonry walls, double doors for the said chamber with a space intermediate of said doors, and a means for filling said space after the doors have been closed.

3. A tomb or vault consisting of a chamber with masonry walls, double doors for the said chamber with a space between said doors, and a passage connecting therewith through which the space may be filled by gravitation.

4. A tomb, burial-vault or like fixed structure formed of masonry and including a receiving-chamber having an end opening and a passage connecting one end of the chamber with the open air, and adapted to receive a disinfecting and deodorizing material, means for closing the open end of the chamber consisting of spaced doors, and means whereby the space between said doors may be filled after the doors have been closed.

5. A tomb, burial-vault or like fixed structure having masonry walls and including a main chamber adapted to receive the body, a supplemental chamber separated from the main chamber and connecting with the latter, and a flue or chimney leading upwardly from the supplemental chamber and having an open communication between its upper end and the atmosphere.

6. A burial-vault consisting of a fixed masonry structure including a chamber adapted to receive the body, means for hermetically sealing the entrance to the chamber, a supplemental chamber and a horizontal diaphragm separating one chamber from the other, a passage between the chambers for the escape of gaseous products of decomposition from the main chamber, and a vertical flue or chimney connecting the supplemental chamber with the atmosphere and having a closed top and transverse passages, said flue adapted to contain a disinfecting and deodorizing material.

In witness whereof I have hereunto set my hand.

HENRY ROOT.

Witnesses:
S. H. NOURSE,
JESSIE C. BRODIE.